(12) United States Patent
Kim et al.

(10) Patent No.: US 9,586,697 B2
(45) Date of Patent: Mar. 7, 2017

(54) BOARDING BRIDGE

(71) Applicant: KOREA AIRPORTS CORPORATION, Seoul (KR)

(72) Inventors: Han Soo Kim, Gimpo-si (KR); Seok Cheol Yang, Busan (KR); Dong Soo Kim, Gimpo-si (KR); Won Lae Lim, Seoul (KR); Gi Young Do, Gimpo-si (KR)

(73) Assignee: KOREA AIRPORTS CORPORATION, Seoul (KR)

( * ) Notice: Subject to any disclaimer, the term of this patent is extended or adjusted under 35 U.S.C. 154(b) by 0 days.

(21) Appl. No.: 15/034,022

(22) PCT Filed: Jun. 10, 2014

(86) PCT No.: PCT/KR2014/005071
§ 371 (c)(1),
(2) Date: May 3, 2016

(87) PCT Pub. No.: WO2015/068923
PCT Pub. Date: May 14, 2015

(65) Prior Publication Data
US 2016/0264261 A1    Sep. 15, 2016

(30) Foreign Application Priority Data
Nov. 5, 2013    (KR) .................. 10-2013-0133805

(51) Int. Cl.
*E01D 15/00*    (2006.01)
*B64F 1/305*    (2006.01)
*E01D 15/10*    (2006.01)

(52) U.S. Cl.
CPC .............. *B64F 1/305* (2013.01); *E01D 15/10* (2013.01)

(58) Field of Classification Search
CPC ................................ B64F 1/305; E01D 15/10
USPC ................................................. 14/69.5–71.5
See application file for complete search history.

(56) References Cited

U.S. PATENT DOCUMENTS

| | | | | |
|---|---|---|---|---|
| 3,561,030 A | * | 2/1971 | Sepios | B64F 1/305 14/71.5 |
| 4,357,860 A | * | 11/1982 | Krzak | B64F 1/305 138/120 |
| 4,543,677 A | * | 10/1985 | Haglund | B64F 1/305 138/120 |

(Continued)

FOREIGN PATENT DOCUMENTS

| | | |
|---|---|---|
| JP | 2007216908 | 8/2007 |
| JP | 2009132228 | 6/2009 |
| JP | 4700643 | 6/2011 |

OTHER PUBLICATIONS

International Search Report—PCT/KR2014/005071 dated Aug. 26, 2014.

*Primary Examiner* — Raymond W Addie
(74) *Attorney, Agent, or Firm* — Cantor Colburn LLP

(57) ABSTRACT

A boarding bridge including: an inner tunnel walking deck which positioned above a floor of an inner tunnel with a space the therebetween, and forms a walking passage of the inner tunnel. An outer tunnel walking deck which positioned above a floor of the outer tunnel with a space therebetween, and forms a walking passage of the outer tunnel. The outer tunnel walking deck positioned at a height between the floor of the inner tunnel and the inner tunnel walking deck.

13 Claims, 12 Drawing Sheets

(56) References Cited

U.S. PATENT DOCUMENTS

| | | | | |
|---|---|---|---|---|
| 5,084,936 | A * | 2/1992 | Thomas, Jr. | B64F 1/305 14/71.5 |
| 6,487,743 | B1 * | 12/2002 | Nicoletti | B64F 1/305 14/71.3 |
| 7,743,445 | B2 * | 6/2010 | Shen | B64F 1/3055 14/71.3 |
| 8,261,394 | B2 * | 9/2012 | Kim | B64F 1/305 14/71.1 |
| 9,090,359 | B2 * | 7/2015 | Wada | B64F 1/305 |
| 9,494,266 | B2 * | 11/2016 | Sabadie | B64C 1/406 |
| 2003/0145399 | A1 * | 8/2003 | Smith | B64F 1/305 14/69.5 |
| 2010/0325818 | A1 * | 12/2010 | Okahira | B64F 1/3055 14/71.5 |

* cited by examiner

BOARDING BRIDGE

TECHNICAL FIELD

The present disclosure relates to a boarding bridge.

BACKGROUND

A boarding bridge is a passage which connects an airport terminal gate to an airplane in order for passengers to safely board the airplane. The boarding bridge has a two-tiered tunnel structure including an inner tunnel and an outer tunnel or a three-tiered tunnel structure in order to be safely connected to the airplane according to whether or not the airplane is moored and a location of the airplane.

In the boarding bridge, there is a difference in height between a floor surface of the inner tunnel and a floor surface of the outer tunnel. There may be a large step difference of about 25 cm between the inner tunnel and the outer tunnel. Accordingly, the inner tunnel and the outer tunnel are provided with an inclined foot plate at a location where the step difference is formed.

However, due to the large step difference between the inner tunnel and the outer tunnel, the foot plate has a high gradient, which gives passengers inconvenience in movement. Particularly, it is impossible for a passenger using a wheel chair to move by him/herself. As for ordinary people, they have the risk of falling down and thus suffering fractures due to a steep gradient.

Regarding a conventional apparatus for reducing a step difference formed between an inner tunnel and an outer tunnel, Japanese Patent No. 4700643 (entitled "Boarding bridge") discloses a boarding bridge in which a step difference between an outer tunnel and an inner tunnel is eliminated by a variable-length passage which is wound or pulled out by rotating a sprocket along with a movement of the outer tunnel.

However, the conventional boarding bridge includes many components including a partition plate constituting the variable-length passage, a partition plate supporting part, a chain for moving the variable-length passage, and the sprocket, and has a complicated structure. Thus, it is difficult to install the conventional boarding bridge.

Since the conventional boarding bridge includes many components for operation, its failure rate is increased. When one of the components is broken, the whole structure needs to be disassembled. Therefore, it is not easy to maintain and repair the conventional boarding bridge.

Further, since the variable-length passage includes the partition plate, it is difficult to manufacture the variable-length passage to have a high stiffness. Thus, it is not suitable for many passengers to use at a time.

DISCLOSURE OF THE INVENTION

Problems to be Solved by the Invention

There is provided a boarding bridge which secures safety and convenience of passengers by reducing a step difference between an outer tunnel and an inner tunnel and also has a simple structure and a high stiffness and is easy to maintain and repair as compared with a conventional boarding bridge.

Means for Solving the Problems

In a first exemplary embodiment of the present disclosure, a boarding bridge including an inner tunnel, and an outer tunnel which is provided to surround at least a part of the inner tunnel from a back side of the inner tunnel and contracted and moved in a forward direction or expanded and moved in a backward direction with respect to the inner tunnel, the boarding bridge comprising: an inner tunnel walking deck which is provided above a floor of the inner tunnel with a space the therebetween, and forms a walking passage of the inner tunnel; and an outer tunnel walking deck which is provided above a floor of the outer tunnel with a space therebetween, and forms a walking passage of the outer tunnel, wherein the outer tunnel walking deck is provided at a height between the floor of the inner tunnel and the inner tunnel walking deck.

Effects of the Invention

According to the above-described exemplary embodiments of the present disclosure, in each of an inner tunnel and an outer tunnel, a floor and a walking passage (an outer tunnel walking deck and an inner tunnel walking deck) are separated from each other. Further, the outer tunnel walking deck is inserted under the inner tunnel walking deck or withdrawn to the outside along with a movement of the outer tunnel. Thus, it is possible to minimize a step difference between the inner tunnel and the outer tunnel by adjusting heights of the walking passages in the inner tunnel and the outer tunnel. Therefore, the whole movement passage of a boarding bridge may have a structure with a gentle gradient.

Further, the outer tunnel walking deck has one body structure. Therefore, the boarding bridge may have a small number of components, a simple structure, a remarkably low failure rate, and a high stiffness.

MODE FOR CARRYING OUT THE INVENTION

Figure 1:
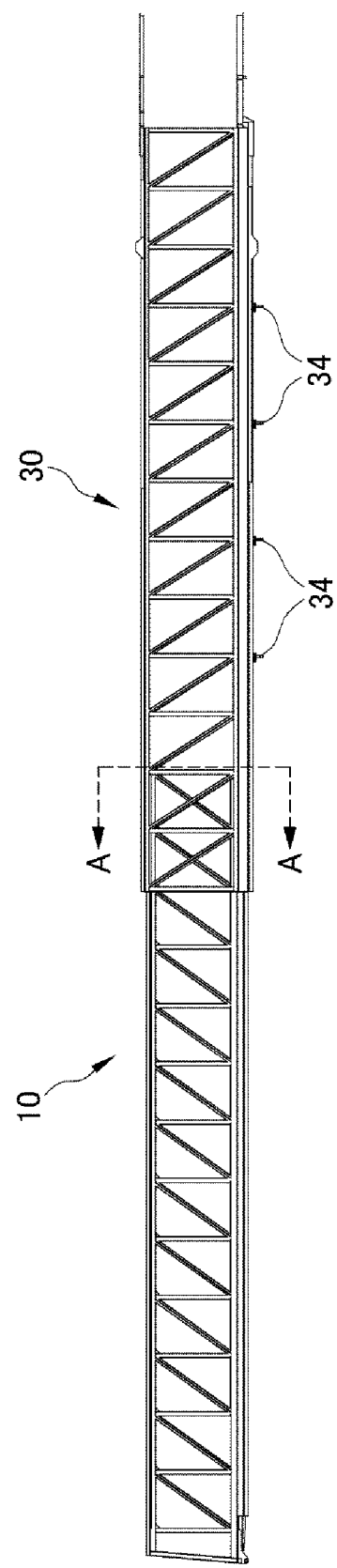
FIG. 1 is a schematic front view of a boarding bridge including an inner tunnel and an outer tunnel according to an exemplary embodiment of the present disclosure.

Hereinafter, embodiments of the present disclosure will be described in detail with reference to the accompanying drawings so that the present disclosure may be readily implemented by those skilled in the art. However, it is to be noted that the present disclosure is not limited to the embodiments but can be embodied in various other ways. In drawings, parts irrelevant to the description are omitted for the simplicity of explanation, and like reference numerals denote like parts through the document.

Through the document, the term "on" that is used to designate a position of one element with respect to another element includes both a case that the one element is adjacent to the another element and a case that any other element exists between these two elements.

Further, through the document, the term "comprises or includes" and/or "comprising or including" are used to mean that one or more other components, steps, operation and/or existence or addition of elements are not excluded in addition to the described components, steps, operation and/or elements unless context dictates otherwise. Through the whole document, the term "about or approximately" or "substantially" is intended to have meanings close to numerical values or ranges specified with an allowable error and intended to prevent accurate or absolute numerical values disclosed for understanding of the present disclosure from being illegally or unfairly used by any unconscionable third party. Through the whole document, the term "step of" does not mean "step for".

For reference, the terms (upper side, lower side, front side, back side, and the like) related to directions or positions in the explanations of the exemplary embodiments of the present disclosure are based on arrangement of respective components as shown in the drawings. By way of example, a top side and a bottom side in FIG. 1 may be an upper side and a lower side, respectively. Further, an inner tunnel 10's side and an outer tunnel 30's side in FIG. 1 may be a front side and a back side, respectively.

Hereinafter, the present disclosure will be described in detail with reference to the accompanying drawings.

A boarding bride in accordance with an exemplary embodiment of the present disclosure (hereinafter, referred to as "the present boarding bridge") will be described.

Figure 2:
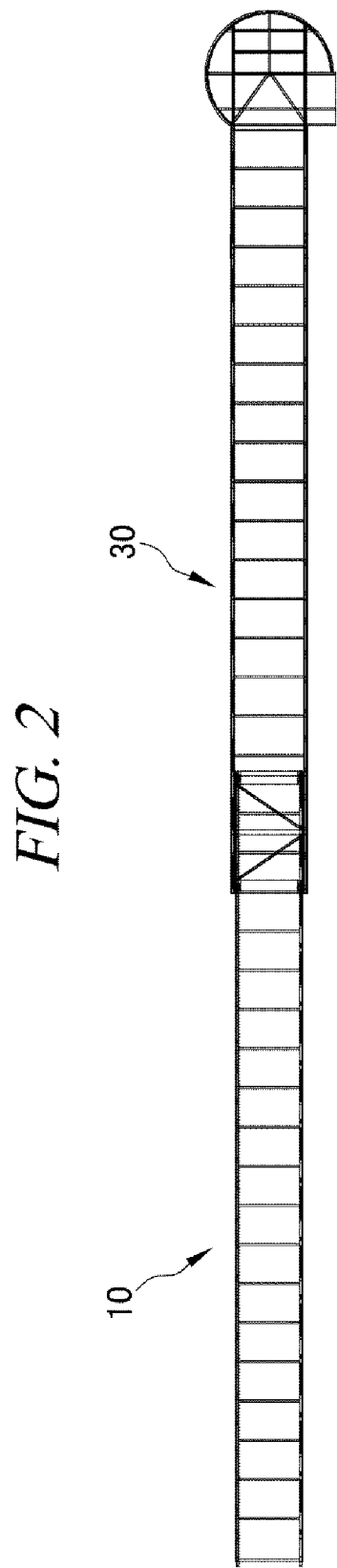
FIG. 2 is a schematic plane view of a boarding bridge including an inner tunnel and an outer tunnel according to an exemplary embodiment of the present disclosure.

FIG. 1 is a schematic front view of a boarding bridge including an inner tunnel and an outer tunnel according to an exemplary embodiment of the present disclosure, and FIG. 2 is a schematic plane view of a boarding bridge including an inner tunnel and an outer tunnel according to an exemplary embodiment of the present disclosure.

The present boarding bridge includes the inner tunnel 10, the outer tunnel 30, an inner tunnel walking deck 12, and an outer tunnel walking deck 32.

The outer tunnel 30 is provided to surround at least a part of the inner tunnel 10 from a back side of the inner tunnel 10, and can be contracted and moved in a forward direction or expanded and moved in a backward direction with respect to the inner tunnel 10.

The inner tunnel walking deck 12 is provided above a floor 11 of the inner tunnel 10 with a space therebetween, and forms a walking passage of the inner tunnel 10.

The outer tunnel walking deck 32 is provided above a floor 31 of the outer tunnel 30 with a space therebetween, and forms a walking passage of the outer tunnel 30.

Further, the outer tunnel walking deck 32 is provided at a height between the floor 11 of the inner tunnel 10 and the inner tunnel walking deck 12.

Thus, when the outer tunnel 30 is moved, the outer tunnel walking deck 32 may be introduced into or withdrawn from a space between the floor 11 of the inner tunnel 10 and the inner tunnel walking deck 12.

In the present boarding bridge, the inner tunnel walking deck 12 and the outer tunnel walking deck 32 are provided separately from the inner tunnel 10's floor and the outer tunnel 30's floor which have been used as walking passages of a conventional boarding bridge, and used as walking passages. Thus, a step difference between a walking passage of the inner tunnel 10 and a walking passage of the outer tunnel 30 can be greatly reduced to less than about 2.5 cm, which eliminates inconvenience in walking. Therefore, it is possible to maximize users' convenience.

Generally, a boarding bridge is a passage which connects an airport terminal gate to an airplane in order for passengers to safely board the airplane. Typically, the boarding bridge has a two-tiered tunnel structure including an inner tunnel and an outer tunnel in order to be safely connected to the airplane according to whether or not the airplane is moored and a location of the airplane.

A conventional boarding bridge has a large step difference between an inner tunnel and an outer tunnel. Accordingly, the inner tunnel and the outer tunnel are provided with an inclined foot plate.

However, due to the large step difference between the inner tunnel and the outer tunnel, the foot plate has a high gradient, which causes great inconvenience to disabled people as well as ordinary people.

Accordingly, in the present boarding bridge, the respective floors of the inner tunnel 10 and the outer tunnel 30 are separated from the walking passages unlike the conventional boarding bridge in which tunnel floors are used as walking passages. Thus, it is possible to minimize a step difference.

To be more specific, the conventional boarding bridge is adjusted in length by slidably moving the outer tunnel in order for the inner tunnel to be inserted into the outer tunnel. Further, in order for the inner tunnel to be inserted into the outer tunnel, a large height difference is formed between the inner tunnel's floor and the outer tunnel's floor in the conventional boarding bridge. Thus, the walking passages have a great step difference between the inner tunnel and the outer tunnel.

However, in the present boarding bridge, the inner tunnel walking deck 12 separated from the floor 11 of the inner tunnel 10 and the outer tunnel walking deck 32 separated from the floor 31 of the outer tunnel 30 are used as the walking passages. Thus, in the present boarding bridge, a height difference between the floor 11 of the inner tunnel 10 and the floor 31 of the outer tunnel 30 is maintained as conventionally designed in order for the inner tunnel 10 to be easily inserted into the outer tunnel 30. Further, a step difference can be minimized by adjusting heights of the inner tunnel walking deck 12 and the outer tunnel walking deck 32 which are the walking passages of the respective tunnels. Therefore, the whole walking passage of the boarding bridge may have a structure with a gentle gradient.

Further, in the present boarding bridge, if the outer tunnel 30 is moved in a direction of inserting the inner tunnel 10 into the outer tunnel 30, i.e., a direction of reducing a length of the boarding bridge, the outer tunnel walking deck 32 is moved to a space between the floor 11 of the inner tunnel 10 and the inner tunnel walking deck 12 as much as a movement distance of the outer tunnel 30. Further, in the present boarding bridge, if the outer tunnel 30 is moved in a direction of increasing the length of the boarding bridge, the outer tunnel walking deck 32 is withdrawn from the space between the floor 11 of the inner tunnel 10 and the inner tunnel walking deck 12 as much as a movement distance of the outer tunnel 30. Thus, in the present boarding bridge, the outer tunnel walking deck 32 can be moved according to a movement of the outer tunnel 30 without interference with other components.

In other words, the present boarding bridge has a structure in which the floor of the inner tunnel 10 is separated from the walking passage and the outer tunnel 32 can be inserted into the space formed therebetween, and, thus, the outer tunnel walking deck 32 can be moved according to a movement of the outer tunnel 30 without interference with other components.

Thus, the present boarding bridge can be used more safely and conveniently by disabled passengers as well as ordinary passengers, and can improve convenience which is a basic purpose of a boarding bridge.

Further, the present boarding bridge has a simple structure in which the outer tunnel walking deck 32 is provided above the floor 31 of the outer tunnel 30 and the inner tunnel walking deck 12 is provided above the floor 11 of the inner tunnel 10. Thus, the present boarding bridge is easy to maintain and repair and also easy to install and has a remarkably low failure rate.

Furthermore, the present boarding bridge can be operated without power since the outer tunnel walking deck 32 is moved at the same time when the outer tunnel 30 is moved.

Hereinafter, the components related to the present boarding bridge will be described in more detail.

Figure 3:
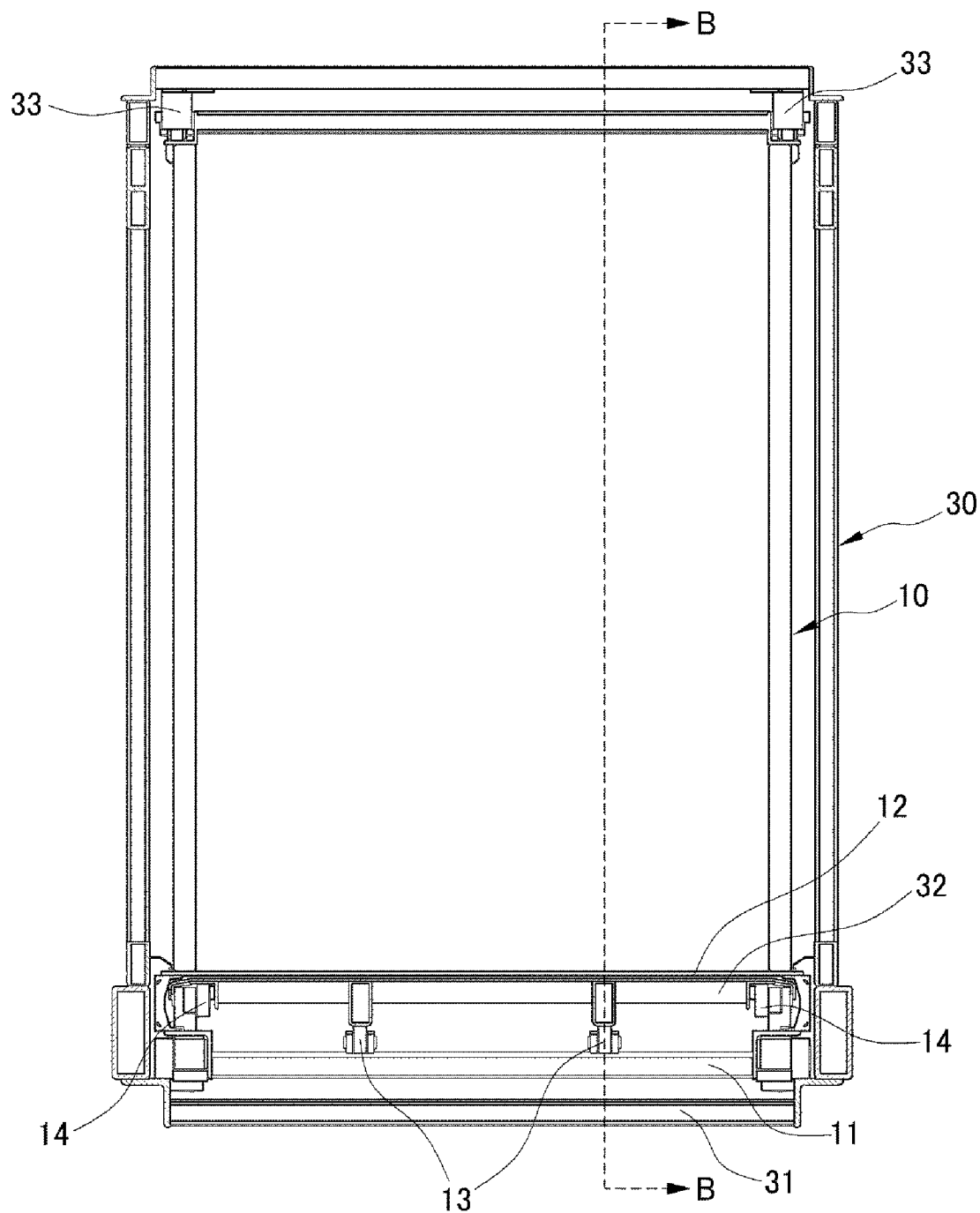
FIG. 3 is a schematic cross-sectional view taken along a line A-A of FIG. 1.
Figure 4:
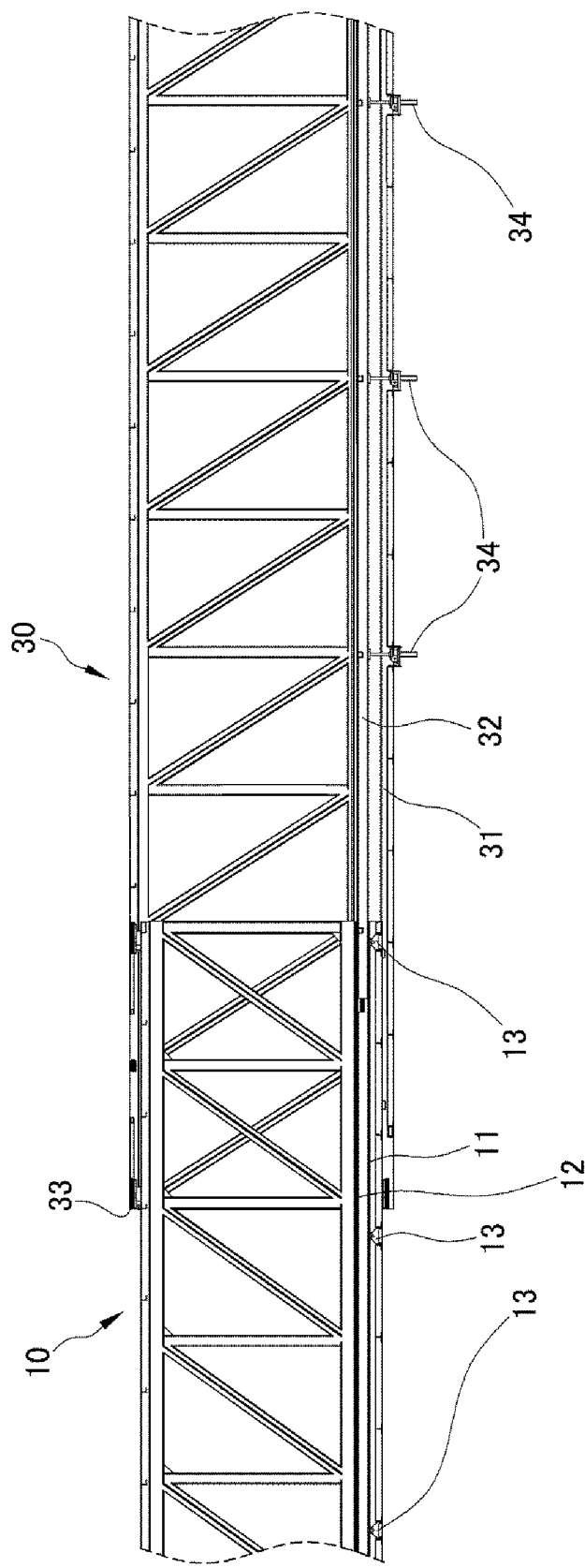
FIG. 4 is a schematic cross-sectional view taken along a line B-B of FIG. 3.
Figure 5:
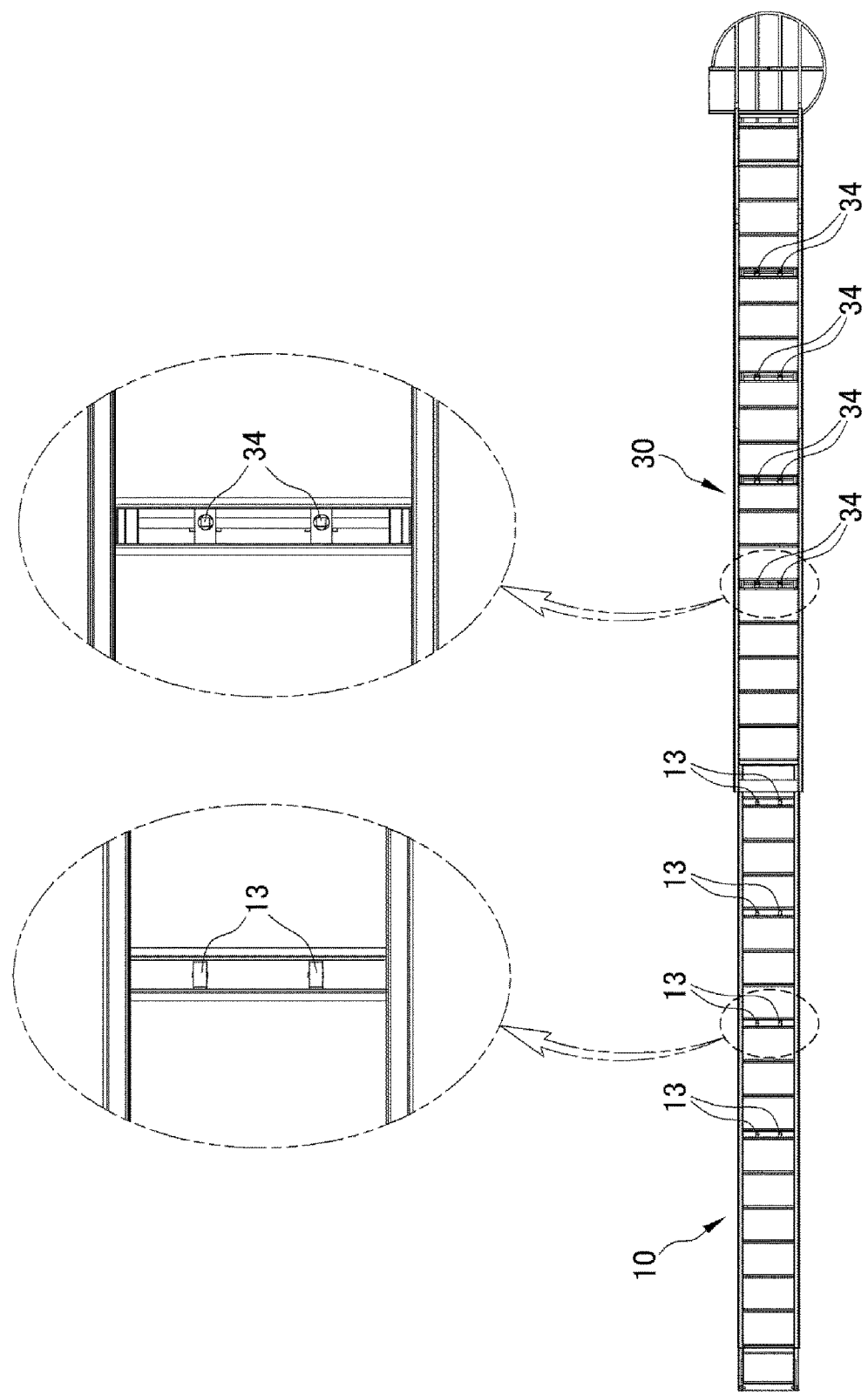
FIG. 5 is a cross-sectional view obtained when the view of FIG. 2 is cut in a horizontal direction.

FIG. 3 is a schematic cross-sectional view taken along a line A-A of FIG. 1, FIG. 4 is a schematic cross-sectional view taken along a line B-B of FIG. 3, and FIG. 5 is a cross-sectional view obtained when the view of FIG. 2 is cut in a horizontal direction.

Figure 6:
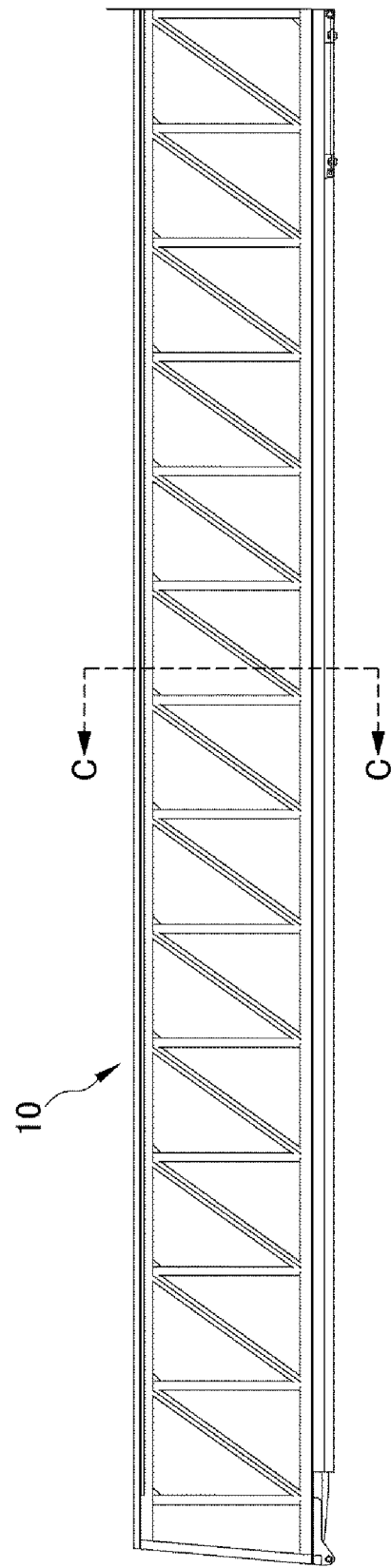
FIG. 6 is a schematic front view of an inner tunnel.
Figure 7:
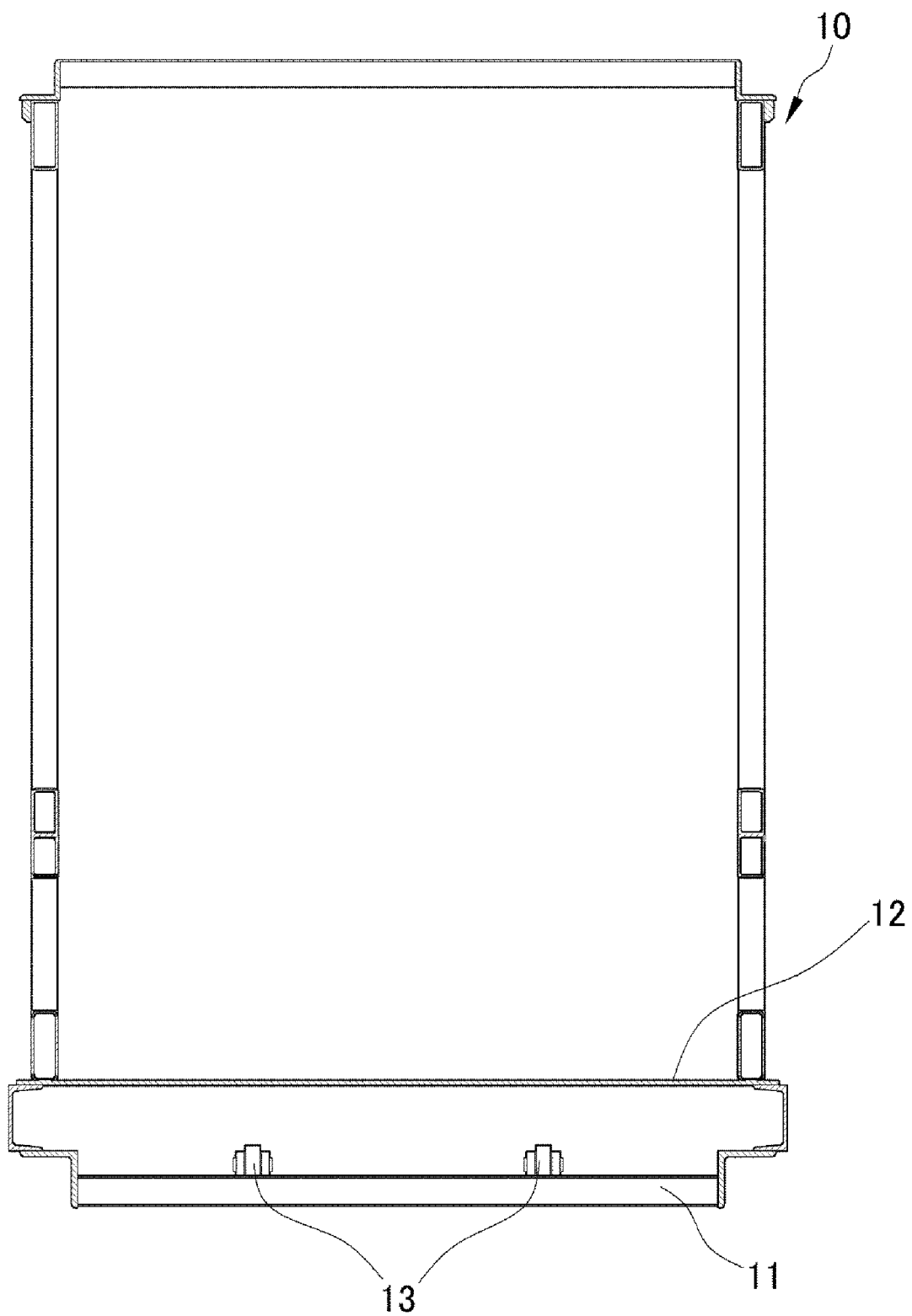
FIG. 7 is a schematic cross-sectional view taken along a line C-C of FIG. 6.
Figure 8:
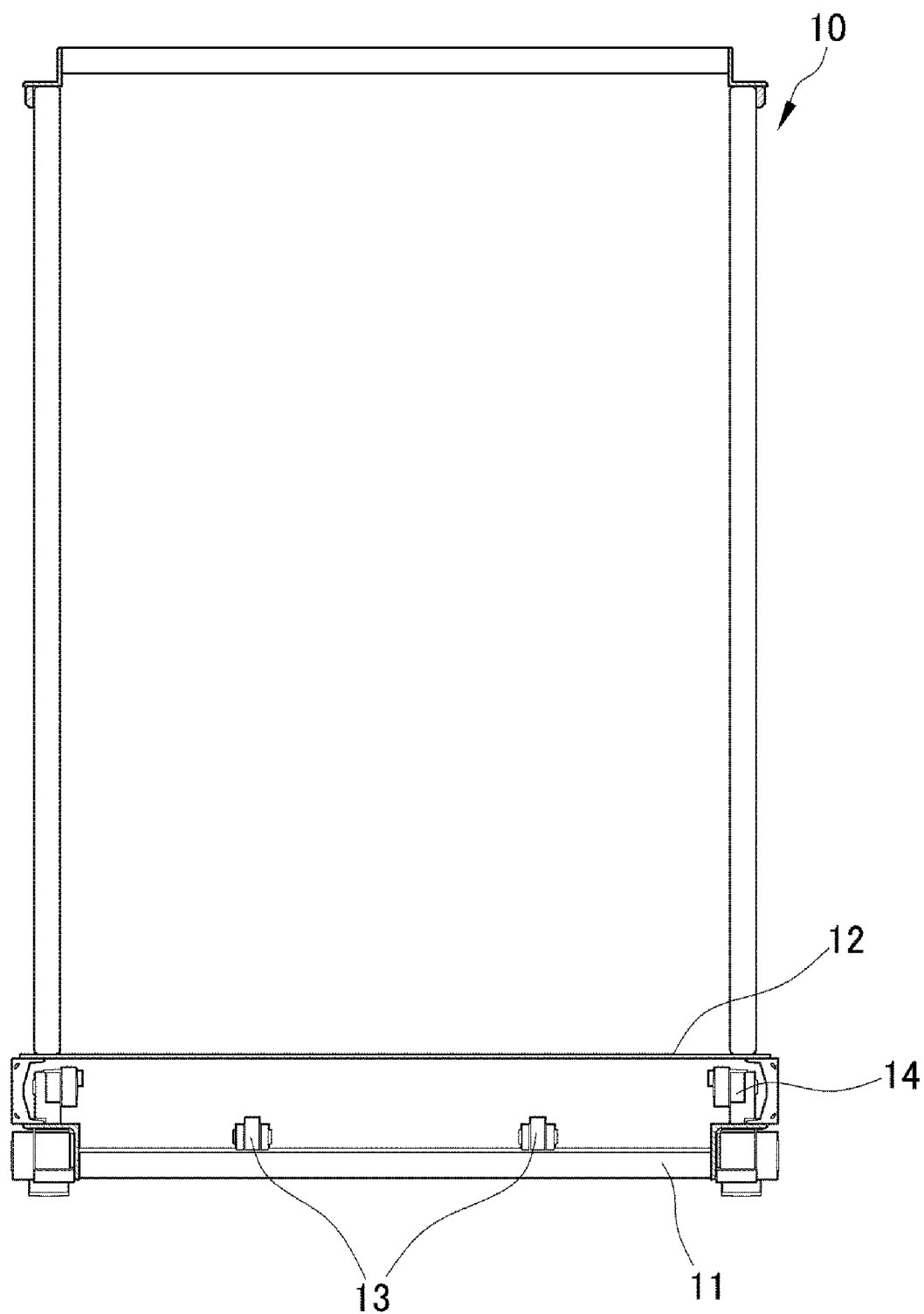
FIG. 8 is a schematic right side view of FIG. 6.

Further, FIG. 6 is a schematic front view of an inner tunnel 10, FIG. 7 is a schematic cross-sectional view taken along a line C-C of FIG. 6, and FIG. 8 is a schematic right side view of FIG. 6.

A separation height between the floor 11 of the inner tunnel 10 and the inner tunnel walking deck 12 may correspond to the sum of a separation height between the floor of the inner tunnel 10 and the outer tunnel walking deck 32 and a thickness of the outer tunnel walking deck 32.

Thus, the outer tunnel walking deck 32 may be provided to be in contact with a lower surface of the inner tunnel walking deck 12. Therefore, it is possible to minimize a step difference between the outer tunnel 30 and the inner tunnel 10.

The inner tunnel 10 may include a guide roller 14 provided on the floor 11 of the inner tunnel 10 to guide forward and backward movements of the outer tunnel walking deck 32.

The guide roller 14 is configured to support the outer tunnel walking deck 32 and also guide the outer tunnel walking deck 32 to more readily move to the space between the floor 11 of the inner tunnel 10 and the inner tunnel walking deck 12.

To be more specific, the outer tunnel 30 is moved as being guided by an outer tunnel sliding roller 33. If the outer tunnel 30 is moved in the direction of reducing the length of the boarding bridge, i.e., in the forward direction, the guide roller 14 may assist the outer tunnel walking deck 32 to readily move in the forward direction.

Further, if the outer tunnel 30 is moved in the direction of increasing the length of the boarding bridge, i.e., in the backward direction, the guide roller 14 may assist the outer tunnel walking deck 32 to readily move in the backward direction.

Herein, a pair of the guide rollers 14 may be symmetrically provided at a location where the outer tunnel walking deck 32 is introduced into the space between the floor 11 of the inner tunnel 10 and the inner tunnel walking deck 12.

Herein, the location where the outer tunnel walking deck 32 is introduced into the space between the floor 11 of the inner tunnel 10 and the inner tunnel walking deck 12 may refer to a back side of the floor 11 of the inner tunnel 10.

Thus, the guide roller 14 may support a front end of the outer tunnel walking deck 32 in a state where the length of the boarding bridge is increased to the maximum extent.

On a lower surface of the outer tunnel walking deck 32, a rail extended along the forward and backward directions may be provided corresponding to a location of the guide roller 14.

By way of example, referring to FIG. 3 and FIG. 8, a pair of the guide rollers 14 may be symmetrically provided at inner wall surfaces of the inner tunnel 10, and the rail may be formed at the circumference of the outer tunnel walking deck 32 corresponding thereto. Each of the pair of the guide rollers 14 may perform a rolling movement along the rail.

Thus, the outer tunnel walking deck 32 can be stably moved while maintaining its balance.

Further, the inner tunnel 10 may include multiple supporting rollers 13 provided at a distance from each other along a longitudinal direction, i.e., forward and backward directions, to support the lower surface of the outer tunnel walking deck 32.

Thus, when the outer tunnel walking deck 32 is moved to the space between the floor 11 of the inner tunnel 10 and the inner tunnel walking deck 12, the outer tunnel walking deck 32 can be continuously supported and a movement thereof can be guided. Therefore, the outer tunnel walking deck 32 can be readily moved, and a load can be distributed.

In other words, the supporting rollers 13 are configured to support the outer tunnel walking deck 32 and also guide a forward or backward movement of the outer tunnel walking deck 32.

To be more specific, if the outer tunnel 30 is moved in the direction of reducing the length of the boarding bridge, supporting rollers 13 in contact with the outer tunnel walking deck 32 among the multiple supporting rollers sequentially perform a rolling movement. Thus, it is possible to support the outer tunnel walking deck 32 and also possible to guide a movement of the outer tunnel walking deck 32.

Herein, a pair of the supporting rollers 13 may be symmetrically provided in a width direction of the inner tunnel 10 and provided at a distance from each other in a longitudinal direction as illustrated in FIG. 3, FIG. 7, and FIG. 8. Therefore, the outer tunnel walking deck 32 can be symmetrically supported and thus can be more stably moved.

By way of example, one or more supporting rollers 13 may be provided every three to five points depending on a length of the inner tunnel 10.

Herein, if the supporting rollers 13 are provided on the floor 11 of the inner tunnel 10, when the supporting rollers 13 are broken, it is possible to separate and replace or repair only the floor 11 of the inner tunnel 11. Thus, the present boarding bridge is easy to maintain and repair.

Meanwhile, the outer tunnel 30 includes a variable supporting part 34 provided to be movable up and down on the floor 31 of the outer tunnel 30 and configured to support the lower surface of the outer tunnel walking deck 32.

Figure 9:
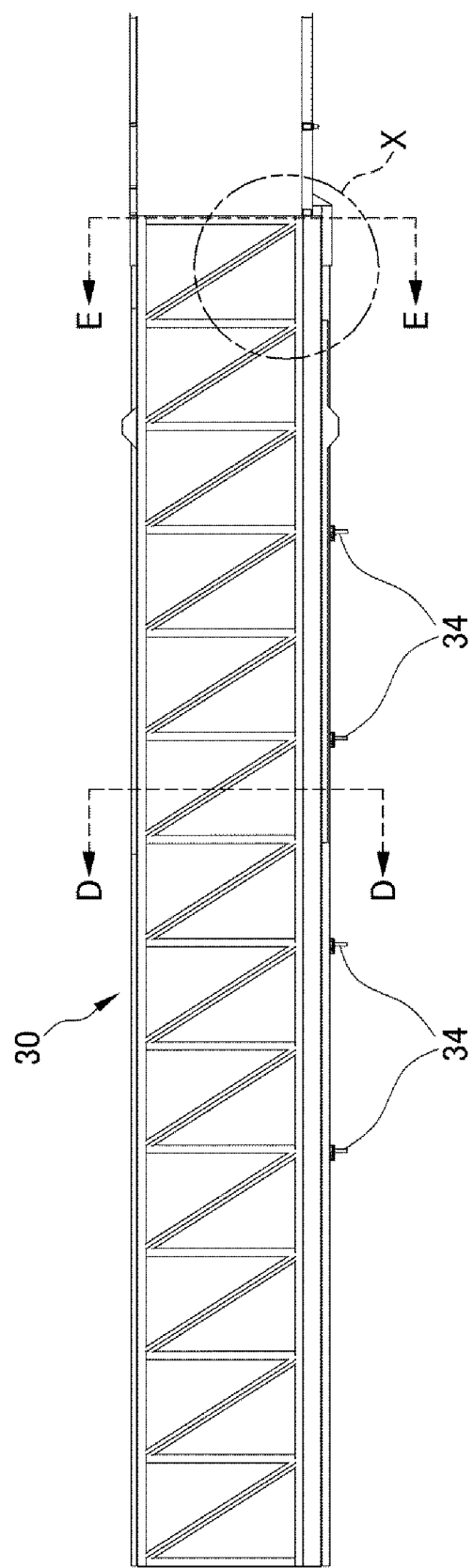
FIG. 9 is a schematic front view of an outer tunnel.
Figure 10:
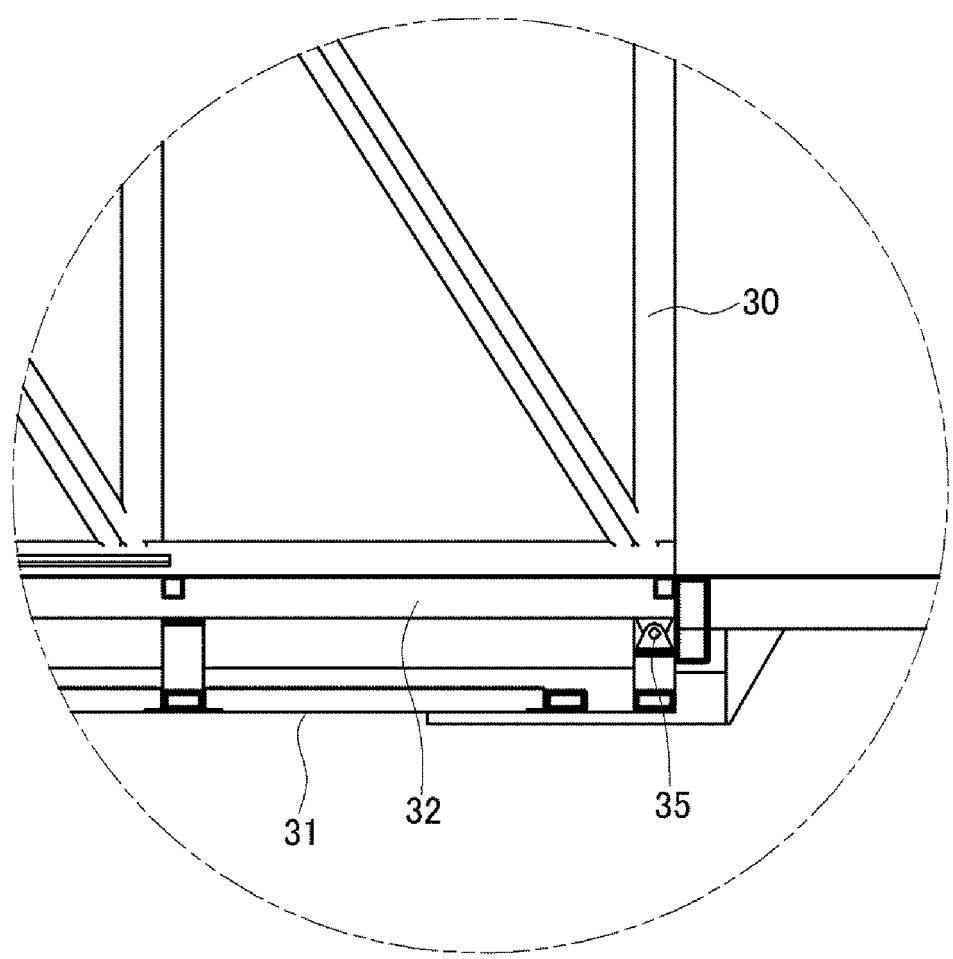
FIG. 10 is a schematic cross-sectional view illustrating a portion X of FIG. 9.
Figure 11:
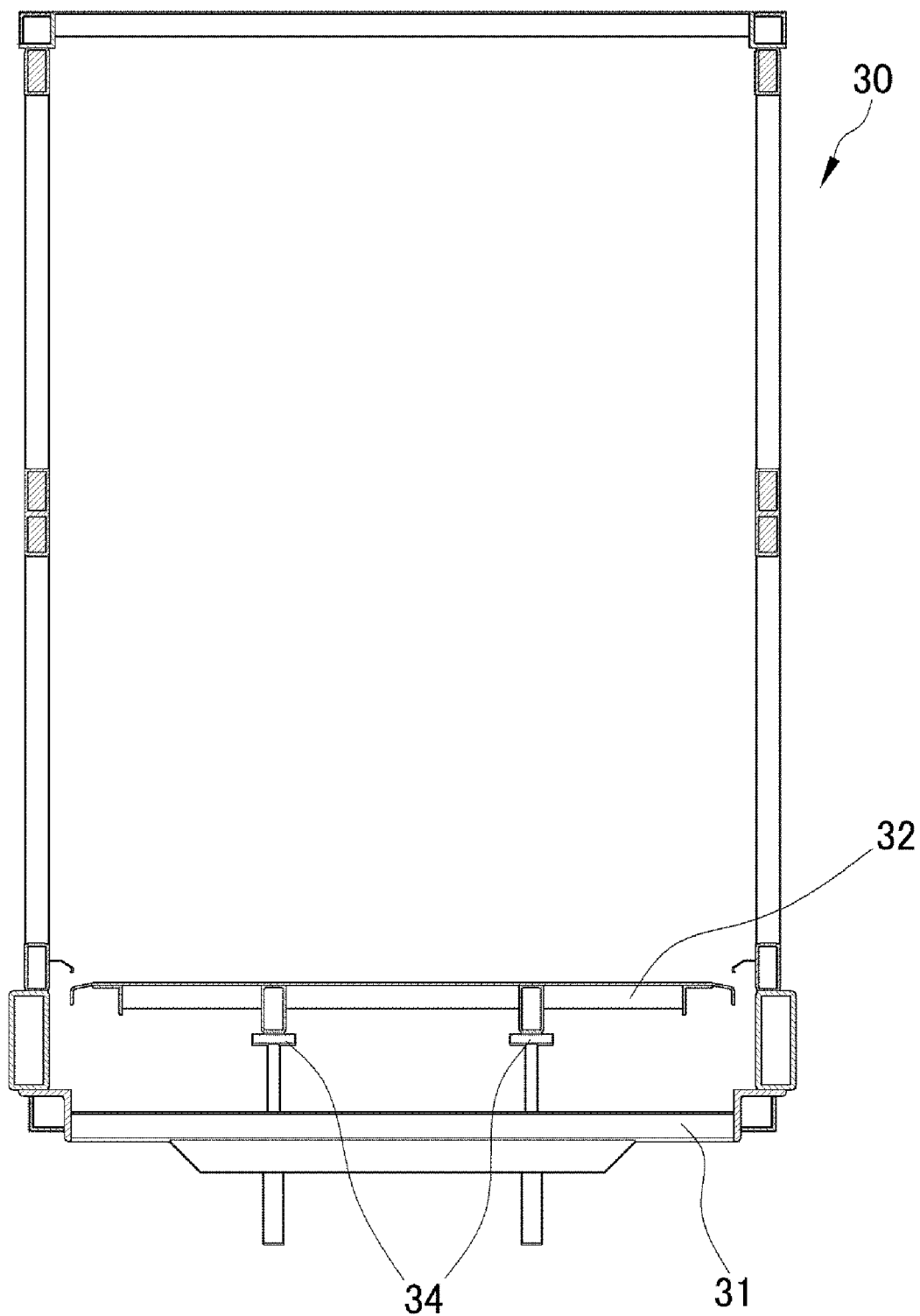
FIG. 11 is a schematic cross-sectional view taken along a line D-D of FIG. 9.

FIG. 9 is a schematic front view of an outer tunnel 30, FIG. 10 is a schematic cross-sectional view illustrating a portion X of FIG. 9, and FIG. 11 is a schematic cross-sectional view taken along a line D-D of FIG. 9.

Figure 12:
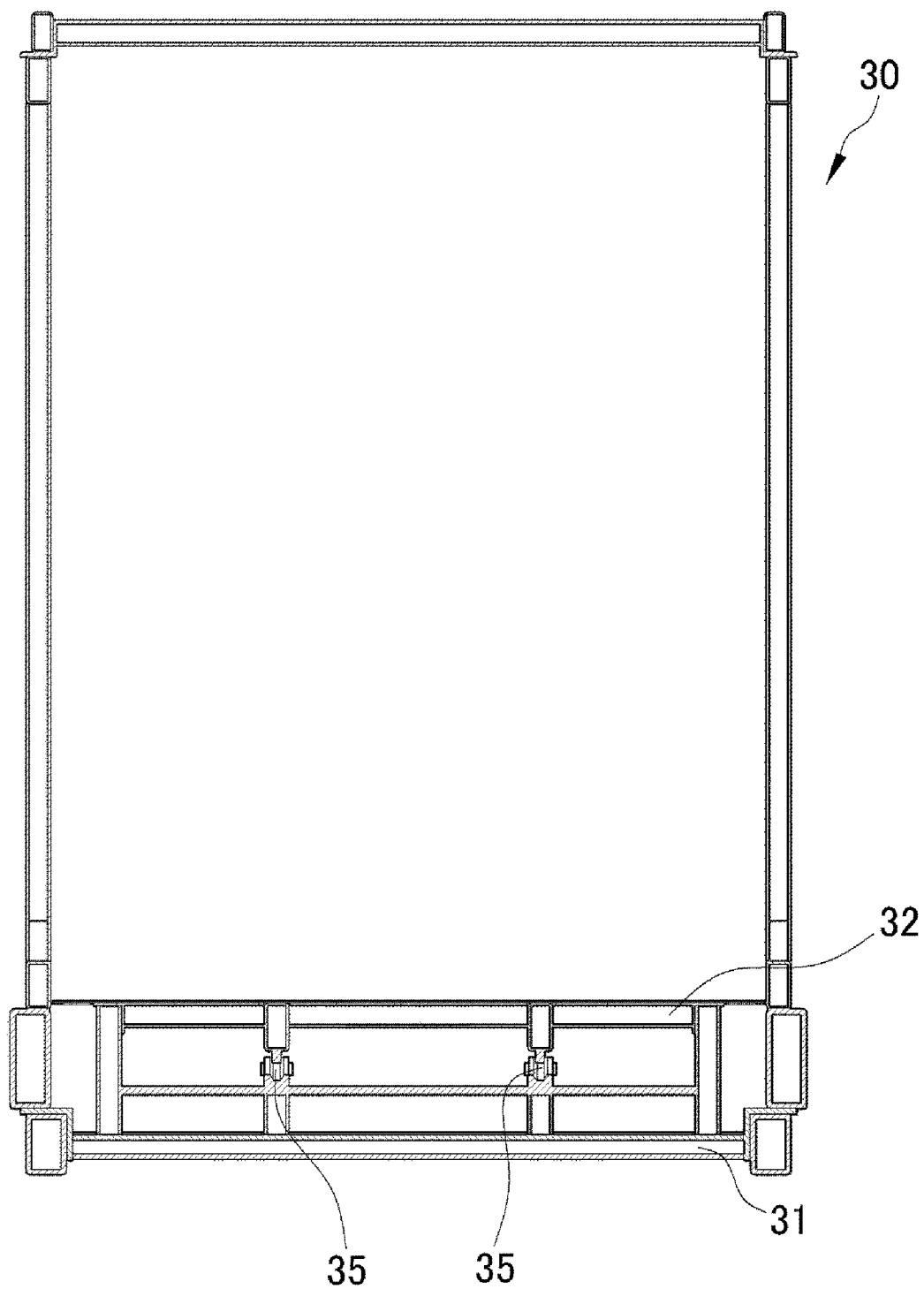
FIG. 12 is a schematic cross-sectional view taken along a line E-E of FIG. 9.

Further, FIG. 12 is a schematic cross-sectional view taken along a line E-E of FIG. 9.

In a state where the outer tunnel 30 is withdrawn from the inner tunnel 10 to the maximum extent, i.e., in a state where the length of the boarding bridge is increased to the maximum extent, a front end of the outer tunnel walking deck 32 may be supported by the above-described guide roller 14 and a back end thereof may be supported by a hinge 35 as illustrated in FIG. 10 and FIG. 12.

Herein, the outer tunnel walking deck 32 may have a length corresponding to a length of the outer tunnel 30. Further, the both ends of the outer tunnel walking deck 32 are supported by the guide roller 14 and the hinge 35, respectively, and, thus, a middle portion of the outer tunnel walking deck 32 may be deflected.

That is, the outer tunnel walking deck 32 has a long end-supported beam shape and thus may be greatly deflected in the middle.

Therefore, the variable supporting part 34 supports the middle portion of the outer tunnel walking deck 32 to suppress deflection of the outer tunnel walking deck 32. Thus, the outer tunnel walking deck 32 can be stably supported. Therefore, passengers can walk on the outer tunnel walking deck 32 more safely and conveniently.

That is, the variable supporting part 34 can distribute a load of the outer tunnel walking deck 32 and further increase the stiffness of the outer tunnel walking deck 32.

Herein, if the variable supporting part 34 is provided on the floor 31 of the outer tunnel 30, when the variable supporting part 34 is broken, it is possible to separate and replace or repair only the floor 31 of the outer tunnel 30. Thus, the present boarding bridge is easy to maintain and repair.

Herein, the variable supporting part 34 may release supporting of the lower surface of the outer tunnel walking deck 32 by downward driving.

Further, the variable supporting part 34 may be moved down to avoid interference with an outer periphery of the inner tunnel 10 when the outer tunnel 30 is contracted and moved in the forward direction.

In the present boarding bridge, if the outer tunnel 30 is moved in the forward direction, the outer tunnel walking deck 32 is inserted into the space between the inner tunnel walking deck 12 and the floor 11 of the inner tunnel 10 and the floor 11 of the inner tunnel 10 is inserted into a space between the outer tunnel walking deck 32 and the floor 31 of the outer tunnel 31.

Accordingly, when the outer tunnel 30 is moved in the forward direction, it is necessary to avoid interference between the variable supporting part 34 supporting the lower surface of the outer tunnel walking deck 32 and the outer periphery of the inner tunnel 10.

In other words, the present boarding bridge has a structure in which if the outer tunnel 30 is moved in the forward direction, the inner tunnel 10 is inserted into the outer tunnel 30, and, thus, the outer tunnel walking deck 32 is inserted into the inner tunnel 10. There is a risk of interference between a back end of the floor 11 of the inner tunnel 10 and the variable supporting part 34 depending on a movement distance of the outer tunnel 30.

Therefore, the variable supporting part 34 provided on the floor 31 of the outer tunnel 30 may be moved down to avoid interference with the floor 11 of the inner tunnel 10 when the outer tunnel 30 is moved in the forward direction. If there is no risk of interference with the floor 11 of the inner tunnel 10, the variable supporting part 34 is moved up to the support the lower surface of the outer tunnel walking deck 32.

That is, since the variable supporting part 34 can perform upward and downward driving, the variable supporting part 34 can support the outer tunnel walking deck 32 along with a movement of the outer tunnel 30 without interference with the inner tunnel 10.

Herein, the variable supporting part 34 is moved up until an upper end of the variable supporting part 34 is brought into contact with the lower surface of the outer tunnel walking deck 32 and thus can support the outer tunnel walking deck 32. Further, the variable supporting part 34 is moved down until the upper end of the variable supporting part 34 is located under an upper surface of the floor 31 of the outer tunnel 30 and thus can release supporting of the outer tunnel walking deck 32.

The variable supporting part 34 may be moved down until being located under the upper surface of the floor 31 of the outer tunnel 30 which is a limit in position for the risk of interference with the floor 11 of the inner tunnel 10.

Thus, it is possible to completely block interference in the variable supporting part 34 with the floor 11 of the inner tunnel 10.

By way of example, the variable supporting part 34 may include a screw jack.

Herein, by way of example, a lower part of the screw jack may be fixed to the floor 31 of the outer tunnel 30, and a supporting plate which can be brought into contact with the lower surface of the outer tunnel walking deck 32 may be provided at an upper part of the screw jack. Further, the screw jack may be operated by a motor.

However, the present disclosure is not limited to the screw jack. A direct drive cylinder operated by a motor, a hydraulic and pneumatic cylinder operated by a hydraulic pressure or a pneumatic pressure, and the like may be modified and used in various ways.

Multiple variable supporting parts 34 may be provided on the floor 31 of the outer tunnel 30 at a distance from each other along a longitudinal direction, i.e., forward and backward directions.

In a state where the outer tunnel 30 is withdrawn from the inner tunnel 10 to the maximum extent, i.e., in a state where the length of the boarding bridge is increased to the maximum extent, the outer tunnel walking deck 32 has a long end-supported beam shape and thus may be greatly deflected in the middle as described above.

Therefore, the multiple variable supporting parts 34 are provided at a distance from each other along the longitudinal direction of the floor 31 of the outer tunnel 30, and, thus, it is possible to more uniformly distribute a load of the outer tunnel walking deck 32 and also possible to secure a high stiffness of the outer tunnel walking deck 32.

By way of example, one or two multiple variable supporting parts 34 may be provided every two to five points depending on the entire length of the outer tunnel 30.

Herein, if two or more multiple variable supporting parts 34 are provided at one point, the variable supporting parts 34 may be synchronously operated by a single motor by directly connecting shafts of the respective variable supporting parts 34 or using a bevel gear, or separately operated by providing motors in the respective variable supporting parts 34.

Further, the multiple variable supporting parts 34 may be symmetrically provided with respect to a center of a width of the floor 31 of the outer tunnel 30 in a width direction of the floor 31 of the outer tunnel 30 as illustrated in FIG. 2 and FIG. 11.

Thus, the variable supporting parts 34 can symmetrically support the outer tunnel walking deck 32 in the width direction. Therefore, the variable supporting parts 34 can more uniformly distribute a load of the outer tunnel walking deck 32 and also stably support the outer tunnel walking deck 32.

Meanwhile, each of the variable supporting parts 34 may be moved down when the outer tunnel 30 is moved in the forward direction. Further, each of the variable supporting parts 34 may be moved up when the outer tunnel 30 is moved in the backward direction.

As described above, if the length of the boarding bridge is reduced, each of the variable supporting parts 34 may be moved down to avoid interference with the floor 11 of the inner tunnel 10. If the length of the boarding bridge is increased, each of the variable supporting parts 34 may be moved up to support the outer tunnel walking deck 32.

Herein, when the outer tunnel 30 is contracted and moved in the forward direction, each of the variable supporting parts 34 may be moved down if it is located within a predetermined operation distance from a back end of the inner tunnel 10.

If the outer tunnel 30 is moved in the direction of reducing the length of the boarding bridge, the multiple variable supporting parts 34 may or may not be placed at locations where there is interference with the floor 11 of the inner tunnel 10 depending on a movement distance of the outer tunnel 30.

Since each of the multiple variable supporting parts 34 may be moved down if it is located within the predetermined operation distance from the back end of the inner tunnel 10, all of the multiple variable supporting parts 34 are not moved down, but only a variable supporting part 34 at a location where there is interference with the floor 11 of the inner tunnel 10 may be moved down depending on a movement distance of the outer tunnel 30. The other variable supporting parts 34 in a raised state may keep supporting the outer tunnel walking deck 32.

That is, the multiple variable supporting parts 34 may be provided in a variable manner to sequentially release supporting and move down to the floor 31 of the outer tunnel 30 depending on a movement distance of the outer tunnel 30.

Herein, the predetermined operation distance may refer to a distance which is sufficiently obtained in order for the variable supporting part 34 to be moved down before being interfered with the back end of the inner tunnel 10.

The present boarding bridge may include a variable supporting part motion sensor (not illustrated) configured to sense that the variable supporting part 34 is within the predetermined operation distance.

By way of example, the variable supporting part motion sensor may be provided between the outer tunnel walking deck 32 and the floor 31 of the outer tunnel 30 to sense the back end of the inner tunnel 10.

By way of example, the variable supporting part motion sensor may be formed by connecting a horseshoe sensor and a photosensor for distance measurement in parallel.

Further, the present boarding bridge may include a movement stop sensor (not illustrated) configured to sense that the variable supporting part 34 is located within a predetermined safe distance from the back end of the inner tunnel 10 and then stop a movement of the outer tunnel 30.

Thus, it is possible to avoid interference in the variable supporting part 34 with the floor 11 of the inner tunnel 10. Therefore, it is possible to suppress damage to the variable supporting part 34.

By way of example, the movement stop sensor may be a photosensor.

Herein, the predetermined safe distance may be shorter than the predetermined operation distance.

If the variable supporting part 34 is located within the predetermined operation distance but not moved down due to a failure or the like, the movement stop sensor may sense this and stop a movement of the outer tunnel 30.

That is, if the variable supporting part motion sensor primarily senses that the variable supporting part 34 is located within the predetermined operation distance, the variable supporting part 34 is moved down to avoid interference with the floor 11 of the inner tunnel 10, and if the movement stop sensor secondarily senses that the variable supporting part 34 is located within the predetermined safe distance, a movement of the outer tunnel 30 is stopped. Therefore, it is possible to suppress damage caused by a collision with the floor 11 of the inner tunnel 10.

That is, interference in the variable supporting part 34 with the back end of the inner tunnel 10 can be doubly suppressed.

The movement stop sensor may be located at a height corresponding to the variable supporting part 34 at the back end of the inner tunnel 10.

If the outer tunnel 30 is moved in the forward direction, the inner tunnel 10 is inserted from the back end into the space between the outer tunnel walking deck 32 and the floor 31 of the outer tunnel 30. Thus, the movement stop sensor may be provided at the back end of the inner tunnel 10.

Herein, since the movement stop sensor is located at the height corresponding to the variable supporting part 34, the movement stop sensor can easily sense whether the variable supporting part 34 is moved down.

Meanwhile, for example, the outer tunnel walking deck 32 may be provided in the form of a single plate. By way of example, the outer tunnel walking deck 32 may have a structure in which a frame has a steel plate as a top plate.

Thus, the outer tunnel walking deck 32 has a high stiffness and is easy to manufacture. Further, the outer tunnel walking deck 32 can reduce vibrations or reverberations generated during movements of passengers.

Further, the outer tunnel walking deck 32 may be designed to sufficiently endure a load generated during movements of passengers.

Meanwhile, for example, the inner tunnel walking deck 12 may be provided by welding a steel plate to a frame of the inner tunnel 10.

A boarding bridge currently used in domestic and overseas airports have given passengers inconvenience in movement due to a large step difference between tunnels, and has a structure in which disabled passengers cannot move by themselves and ordinary people may suffer fractures due to a step difference. That is, the boarding bridge has a structure that cannot ensure safety of passengers. Therefore, when boarding an airplane, boarding bridge users have experienced great inconvenience in movement.

The present boarding bridge includes the inner tunnel walking deck 12 and the outer tunnel walking deck 32 as separate walking passages above the floor 11 of the inner tunnel 10 and the floor 31 of the outer tunnel 30, respectively. Thus, it is possible to minimize a step difference between the inner tunnel 10 and the outer tunnel 30 and thus possible to suppress passengers' falling accidents caused by a step difference. Therefore, passengers using the boarding bridge have a convenient and safe movement passage. Accordingly, user satisfaction can be improved.

Particularly, a disabled passenger using a wheel chair can move by him/herself, and, thus, convenience for the disabled can be improved, which may satisfy the welfare policies for the disabled which have been gradually tightened.

In other words, in the present boarding bridge, the separate walking passages are provided within the tunnels, and a step difference between the inner tunnel 10 and the outer tunnel 30 can be greatly reduced by adjusting the heights of the walking passage in the inner tunnel 10 and the walking passage in the outer tunnel 30. Therefore, a foot plate is eliminated and a walking space within the boarding bridge is straightened. Thus, a disabled passenger using a wheel chair as well as an ordinary passenger can move conveniently and safely.

Further, a rainwater pipe generally installed at a boarding bridge can be eliminated. Thus, an inner space of the boarding bridge can be expanded and neatly finished. Thus, passengers can use the boarding bridge pleasantly and comfortably. Further, the boarding bridge makes it convenient to move a wheel chair. Thus, airline workers' workload can be reduced and their satisfaction can be improved.

The above description of the present disclosure is provided for the purpose of illustration, and it would be understood by those skilled in the art that various changes and modifications may be made without changing technical conception and essential features of the present disclosure. Thus, it is clear that the above-described embodiments are illustrative in all aspects and do not limit the present disclosure. For example, each component described to be of a single type can be implemented in a distributed manner. Likewise, components described to be distributed can be implemented in a combined manner.

The scope of the present disclosure is defined by the following claims rather than by the detailed description of the embodiment. It shall be understood that all modifications and embodiments conceived from the meaning and scope of the claims and their equivalents are included in the scope of the present disclosure.

We claim:

1. A boarding bridge including an inner tunnel, and an outer tunnel which is provided to surround at least a part of the inner tunnel from a back side of the inner tunnel and contracted and moved in a forward direction or expanded and moved in a backward direction with respect to the inner tunnel, the boarding bridge comprising:
   an inner tunnel walking deck which is provided above a floor of the inner tunnel with a space the therebetween, and forms a walking passage of the inner tunnel; and
   an outer tunnel walking deck which is provided above a floor of the outer tunnel with a space therebetween, and forms a walking passage of the outer tunnel,
   wherein the outer tunnel walking deck is provided at a height between the floor of the inner tunnel and the inner tunnel walking deck.

2. The boarding bridge of claim 1,
   wherein a separation height between the floor of the inner tunnel and the inner tunnel walking deck corresponds to the sum of a separation height between the floor of the inner tunnel and the outer tunnel walking deck and a thickness of the outer tunnel walking deck.

3. The boarding bridge of claim 1,
   wherein the inner tunnel includes a guide roller provided on the floor of the inner tunnel to guide forward and backward movements of the outer tunnel walking deck.

4. The boarding bridge of claim 3,
   wherein on a lower surface of the outer tunnel walking deck, a rail extended along the forward and backward directions is provided corresponding to a location of the guide roller.

5. The boarding bridge of claim 1,
   wherein the inner tunnel includes multiple supporting rollers provided at a distance from each other along the forward and backward directions to support a lower surface of the outer tunnel walking deck.

6. The boarding bridge of claim 1,
   wherein the outer tunnel includes a variable supporting part provided to be movable up and down on the floor of the outer tunnel and configured to support a lower surface of the outer tunnel walking deck, and
   the variable supporting part releases supporting of the lower surface of the outer tunnel walking deck by downward driving.

7. The boarding bridge of claim 6,
   wherein the variable supporting part is moved down to avoid interference with an outer periphery of the inner tunnel when the outer tunnel is contracted and moved in the forward direction.

8. The boarding bridge of claim 6,
   wherein multiple variable supporting parts are provided on the floor of the outer tunnel at a distance from each other along the forward and backward directions.

9. The boarding bridge of claim 8,
   wherein when the outer tunnel is contracted and moved in the forward direction, each of the variable supporting parts is moved down if it is located within a predetermined operation distance from a back end of the inner tunnel.

10. The boarding bridge of claim 9, further comprising:
    a variable supporting part motion sensor configured to sense that the variable supporting part is within the predetermined operation distance.

11. The boarding bridge of claim 10, further comprising:
    a movement stop sensor configured to sense that the variable supporting part is located within a predetermined safe distance from the back end of the inner tunnel,
    wherein when the movement stop sensor senses that the variable supporting part is located within the predetermined safe distance, a movement of the outer tunnel is stopped.

12. The boarding bridge of claim 11,
    wherein the predetermined safe distance is shorter than the predetermined operation distance.

13. The boarding bridge of claim 11,
    wherein the movement stop sensor is located at a height corresponding to the variable supporting part at the back end of the inner tunnel.

* * * * *